United States Patent [19]

Hutkins et al.

[11] Patent Number: 5,186,962
[45] Date of Patent: Feb. 16, 1993

[54] COMPOSITION AND METHOD FOR INHIBITING PATHOGENS AND SPOILAGE ORGANISMS IN FOODS

[75] Inventors: Robert W. Hutkins, Lincoln, Nebr.; Elaine D. Berry, Raleigh, N.C.; Michael B. Liewen, Shorewood, Minn.

[73] Assignee: Board of Regents of the University of Nebraska, Lincoln, Nebr.

[21] Appl. No.: 668,067

[22] Filed: Mar. 12, 1991

[51] Int. Cl.$^5$ .............................................. A23L 3/00
[52] U.S. Cl. ...................................... 426/61; 426/38; 426/40; 426/43
[58] Field of Search ................ 426/61, 34, 38, 40, 426/43, 42

[56] References Cited

U.S. PATENT DOCUMENTS

| | | |
|---|---|---|
| 4,599,313 | 7/1986 | Gonzalez . |
| 4,790,994 | 12/1988 | Matrozza ............................ 426/61 |
| 4,874,704 | 10/1989 | Boudreaux et al. . |
| 4,880,743 | 11/1989 | Matrozza ............................ 426/61 |
| 4,883,673 | 11/1989 | Gonzalez ............................ 426/61 |
| 4,929,445 | 5/1990 | Vandenbergh ..................... 426/61 |
| 5,015,487 | 5/1991 | Collison ............................ 426/332 |

OTHER PUBLICATIONS

B. Barnes et al., Morbid. Mortal. Weekly Rep. 38:267–268 (1989).
R. L. Buchanan et al., Appl. Environ. Microbiol. 55:599–603 (1989).
S. J. Bailey et al., J. Food Prot. 52:148–150 (1989).
M. Gitter, Vet. Res. 99:336 (1976).
J. M. Farber et al., Can. Inst. Food Sci. Technol. J. 21:430–434 (1988).
K. S. Richter et al., Abstract P8, 89th Annual Meeting, American Society of Microbiology, New Orleans, LA, May 14–18 (1989).
K. S. Richter, M. S. Thesis entitled "Physical and Genetic Properties of a Bacteriocin Produced by a Pediococcus, sp. Active Against Listeria monocytogenes", University of Nebraska–Lincoln (1989).
A. K. Bhunia et al., J. Appl. Bacteriol. 65:261–268 (1988).
D. Graham and L. McKay, Appl. Envir. Microb. 50:532–534 (1985).
C. Gonzalez and B. Kunka, Appl. Envir. Microb. 53:2534–2538 (1987).
D. G. Hoover, et al., J. Food Protection 51:29–31 (1988).
M. J. Pucci et al., Appl. Envir. Microb. 54:2349–2353 (1988).
S. E. Gilliland and M. L. Speck, J. Food Science 40:903–905 (1975).
M. Raccach et al., J. Food Science 44:43–46 (1979).
F. K. Lucke et al., FEMS Microb. Rev. 87:P85 (Abstract E3) (1990).
Maniatis et al., Molecular Cloning: A Laboratory Manual, 521 pages (pages 97–107 and 403–431) (1982).
P. M. Muriana and T. R. Klaenhammer, Appl. Environ. Microbiol. 53:553–560 (1987).
M. J. van Belkum et al., Appl. Environ. Microbiol. 55:1187–1191 (1989).
C. Daly et al., J. Dairy Science 53:637–638 (Abstract M33) (1970).
C. Daly et al., J. Milk Food Technol. 35:349 (1972).
N. Tanaka et al., J. Food Protection 43:450–457 (1980).
F. J. Bailey et al., Can. J. Microbiol. 17:61–67 (1971).
K. Scherwitz Harmon et al., Appl. Envir. Microbiol. 53:1171–1174 (1987).
J. H. Keene, Can. J. Microbiol. 12: 425–427 (1966).
J. London, Ann. Rev. Microbiol. 30: 279–301 (1976).
P. C. Vasavada, Prepared Foods Jun. 1988: 122–125 (1988).

Primary Examiner—Carolyn Paden
Attorney, Agent, or Firm—Merchant, Gould, Smith, Edell, Welter & Schmidt

[57] ABSTRACT

The method of the invention uses live cells of non-fermenting and/or non-growing lactic acid bacteria to deliver bacteriocin into edible food substances to inhibit the growth of food spoilage and/or foodborne pathogenic organisms. The method of the invention may be used to inhibit growth of these organisms in raw food substances and finished food products after processing. The lactic acid bacteria within the food mixture are capable of producing bacteriocin in the desired microbial-inhibiting amounts under conditions of non-growth and non-fermentation.

27 Claims, 3 Drawing Sheets

COMPOSITION AND METHOD FOR INHIBITING PATHOGENS AND SPOILAGE ORGANISMS IN FOODS

BACKGROUND OF THE INVENTION

The presence of food spoilage organisms and pathogens in foods is a major concern to the food processing industry, government regulatory agencies and food consumers. Foodborne pathogens have been responsible for several food poisoning outbreaks, some of which have resulted in serious illness and death. In addition, the presence of pathogenic organisms in foods has led to numerous product recalls, product losses, and considerable negative publicity to the food industry. For example, a report of a case of listeriosis associated with the consumption of turkey franks provided direct evidence of the infection by Listeria monocytogenes linked to poultry products (Barnes et al., *Morbid. Mortal. Weekly Rep.* 38:267-268 (1989)). It has also been shown that *L. monocytogenes* occurs commonly in seafoods, poultry, and meats including cured and fermented meats. See, for example, Buchanan et al, *Appl. Environ. Microbiol.* 55:599-603 (1989); Bailey et al., *J. Food Prot.* 52:148-150 (1989); M. Gitter, *Vet. Res.* 99:336 (1976); and Farber et al., *Can. Inst. Food Sci. Technol. J.* 21:430-434 (1988).

Lactic acid bacteria are known to produce inhibiting substances such as hydrogen peroxide, antibiotics and bacteriocins. These bacteria are also capable of lowering the oxidation/reduction potential of the growth medium, and may compete with other lactic acid bacteria or pathogens and spoilage organisms for essential nutrients.

Lactic acid bacteria, including Lactobacillus species, and Pediococcus species, used as fermentation starter cultures, have been screened and shown to produce bacteriocins. The spectrum of bacteriocin activity against various microorganisms, including *Listeria monocytogenes* and other bacterial strains, has also been assessed (as cited in Richter et al., Abstract P8, 89th Annual Meeting, American Society of Microbiology, New Orleans, LA, May 14-18 (1989); and Richter, K. S., M. S. Thesis entitled "Physical and Genetic Properties of a Bacteriocin Produced by a Pediococcus sp. Active Against *Listeria monocytogenes*, University of Nebraska-Lincoln (1989), the disclosure of which are incorporated by reference herein). For example, pediocin PA-1 produced by *Pediococcus acidilactici* PAC 1.0 has been found to inhibit a wide spectrum of gram positive organisms, including several genera of lactic acid bacteria and various food isolates of *Listeria monocytogenes*. *P. pentosaceus* FBB63 also inhibited *L. monocytogenes*, although to a lesser extent. Other bacteriocins of the genus Pediococcus and their spectrum of activity have also been characterized, including pediocin AcH by *P. acidilactici* H, and pediocin A by *P. pentosaceus* FBB61, L7230 and FBB63 (as cited in K. S. Richter, M. S. Thesis, page 41-43, Univ. Neb.-Lincoln (1989)). The antimicrobial activity of pediocin AcH, was tested against several pathogenic and food spoilage bacteria, including *Listeria monocytogenes* (Bhunia et al., *J. Appl. Bacteriol.* 65:261-268 (1988)).

The production of bacteriocin by various strains of Pediococcus species has been associated with the presence of plasmid DNA D. Graham and L. McKay, *Appl. Envir. Microb.* 50:532-534 (1985); C. Gonzalez and B. Kunka, *Appl. Envir. Microb.* 53:2534-2538 (1987)). Bacteriocins associated with plasmid DNA from strains of *Pediococcus acidilactici* and *P. pentosaceus* have been shown to inhibit *Listeria monocytogenes*, *Streptococcus faecalis* and *Leuconostoc mesenteroides* (Hoover, et al., *J. Food Protection* 51:29-31 (1988)).

Several ways of inhibiting Listeria and other foodborne pathogens in food products using bacteriocins have been reported. For example, bacteriocins isolated from lactic acid bacteria have been separately added to food products to inhibit foodborne organisms. U.S. Pat. No. 4,929,445 to Vandenbergh et al. (issued May 19, 1990; filed Jan. 25, 1988) discloses a method of inhibiting *Listeria monocytogenes* in unspoiled foods, such as milk-based cheeses, ice cream, meats and fish, by adding bacteriocin derived from *Pediococcus acidilactici* as a dried powder to inhibit the Listeria at a pH range of about pH 4-9. Pucci et al disclose that where a dried powder of bacteriocin PA-1 produced by *Pediococcus acidilactici* was used to inhibit *Listeria monocytogenes*, it was found that the Listeria was inhibited due to a synergistic effect of lactic acid and bacteriocin (*Appl. Envir. Microb.* 54:2349-2353 (1988)). Since the production of bacteriocin preparations can be time-consuming and costly, it is desired that a system be developed in which viable cells of bacteriocin-producing organisms may be directly added to a food substance to provide inhibition of pathogens and food spoilage organisms.

In food fermentations, bacteriocin-producing lactic acid bacteria have been used as fermentation starter cultures for fermenting meat and providing bacteriocins to inhibit growth of pathogens and spoilage organisms. For example, bacteriocin-producing Pediococcus species were used as a fermentative starter culture to inhibit *Listeria monocytogenes* in fermented summer sausage (Richter, K. S., M. S. Thesis entitled "Physical and Genetic Properties of a Bacteriocin Produced by a Pediococcus sp. Active Against *Listeria monocytogenes*, University of Nebraska-Lincoln (1989)). The preservation of the cured, dried, fermented sausage from spoilage and pathogenic microorganisms was due to a number of factors, including low water activity, sodium chloride, sodium nitrite, and low pH due to the production of lactic acid by the starter culture organisms. However, while growth may be suppressed during fermentation and the drying process, these organisms may survive in the finished product. Therefore, there is a need for a means of inhibiting growth of foodborne pathogens and food spoilage organisms in fully processed, and/or fermented or cured foods.

Psychrotrophic bacteria can grow at temperatures as low as 4° C., so that even refrigeration offers relatively minimal protection if a food product is contaminated with these organisms. Viable cells of lactic acid bacteria which produce hydrogen peroxide without fermentation have been used to inhibit food-borne human pathogen or spoilage microorganisms in food during refrigerated storage. *Lactobacillus bulgaricus* and *L. lactis* inhibited psychrotrophic bacteria, *Pseudomonas fragi* and psychrotroph MC-60N, a Gram negative rod isolated from raw milk, in ground beef stored at 5° C. by production of hydrogen peroxide. (S. E. Gilliland and M. L. Speck, *J. Food Science* 40:903-905 (1975)). In ground and mechanically deboned poultry meat refrigerated at 3° C., resting cells of meat starter cultures of *Pediococcus cerevisiae* and/or *Lactobacillus plantarum* were shown to inhibit psychrotrophic bacteria (Raccach et al., *J. Food Science* 44:43-46 (1979)). In refrigerated, packaged processed food, viable cells of a Lactobacillus which produced hydrogen peroxide without fermentation were used to inhibit food-borne pathogens and spoilage microorganisms (U.S. Pat. No. 4,874,704 to Boudreaux et al. (issued Oct. 17, 1989; filed Mar. 14, 1988)). A composition of a lactic acid-producing bacteria, such as *Streptococcus lactis* subsp. *diacetylactis*, which produces a diacetyl flavor, and a *Pediococcus* which generates hydrogen peroxide, such as *Pediococcus pentosaceus*, were disclosed for inhibiting psychrotrophic bacteria in refrigerated milk or cream-based products, without fermentation or increase in cell count (U.S. Pat. No. 4,880,743 to Matrozza et al. (issued Nov. 14, 1989; filed Jul. 27, 1988)). However, since hydrogen peroxide can adversely affect the organoleptic characteristics of a food substance, there is a need for a non-destructive means of controlling psychrotrophs in meat and other food products under refrigeration conditions, by organisms which do not produce hydrogen peroxide in significant amounts in the food product.

*Lactobacillus sake* LL6706, a *Lactobacillus* species which produces the bacteriocin sakacin A, was found to inhibit *Listeria monocytogenes* in refrigerated meat. A bacteriocin effect was observed in comminuted cured pork at 15° C. and pH 5.7, but not in pork of pH 6.3–6.4, nor in pasteurized minced meat held 6 days at 8° C. (Lucke et al., *FEMS Microb.Rev.* 87:*P*85 (*Abstract E*3) (1990)). It was found that the use of *L. sake* as a "protective" culture in meats was limited by several factors including the slow diffusion rate of sakacin A to target cells, the inactivation of this bacteriocin over time, and the lack of sensitivity of all strains of *L. monocytogenes* to sakacin A.

Non-carbohydrate fermenting lactic acid bacteria have also been used to inhibit spoilage of lactose-containing food products. For example, cells of a non-lactose fermenting *Streptococcus lactis* have been added to lactose-containing foods, particularly milk products, to inhibit spoilage (U.S. Pat. No. 4,599,313 to Gonzalez, C. F. (issued Jul. 8, 1986)).

Therefore, an object of the invention is to provide a system in which an organism capable of producing bacteriocin will inhibit the growth of pathogens and spoilage organisms in foods by producing bacteriocin without cell growth and/or fermentation. Another object is to provide a non-destructive method of inhibiting pathogens and spoilage organisms in foods using living cells of lactic acid bacteria wherein the organoleptic properties of the food are not changed as a result of cell growth and/or fermentation by the bacteriocin-producing organism. A further object is to provide a method in which living cells of lactic acid bacteria are combined with a food substance to inhibit the growth of pathogens and spoilage organisms by providing inhibiting amounts of bacteriocin. Yet another object is to provide a food mixture containing living cells of lactic acid bacteria and a food substance, wherein the lactic acid bacteria inhibit the growth of pathogens and/or spoilage organisms by producing bacteriocin without cell growth and/or fermentation.

SUMMARY OF THE INVENTION

These and other goals are met by the present invention which is directed to food mixtures for inhibiting the growth of food spoilage and/or pathogenic organisms in edible food substances, and methods of inhibiting such growth. The invention involves a combination of an edible food substance and a sufficient amount of a non-growth concentration of living bacteriocin producing lactic acid bacterial cells that will nevertheless produce sufficient bacteriocin to substantially inhibit growth of food spoilage or pathogenic organisms.

It has been surprisingly discovered that under certain conditions or with certain modifications, lactic acid bacteria within the food mixture will produce bacteriocin in the desired microbial-inhibiting amounts even though there is little or no cell growth, fermentation, or organic acid production by the lactic acid bacteria. Accordingly, the living cells of the bacteriocin-producing lactic acid bacteria are combined with an edible food substance under non-growing or non-fermenting conditions, but which are able to produce bacteriocin for inhibition of the growth of pathogens and food spoilage organisms yet preserve the organoleptic properties of the food substance. The organoleptic properties of the food substance are not altered significantly by the presence of the lactic acid bacteria.

One embodiment of the method of the invention, involves combining an edible food substance with modified lactic acid bacteria to produce the food mixture. The edible food substance contains a substrate that is fermentable by lactic acid bacteria. The added population of living, bacteriocin-producing lactic acid bacterial cells, however, has been modified so that it is rendered incapable of significantly fermenting or metabolizing the substrate. The substrate may be a nutrient, carbohydrate, and/or other nutrient substance required for growth of unmodified lactic acid bacteria.

This embodiment of the method may preferably use non-fermentative lactic acid bacteria or derivative thereof which is incapable of significantly fermenting a nutrient, carbohydrate such as glucose, lactose, sucrose, raffinose, xylose, and the like, and/or other substance which is contained in the food substance and required for fermentation, as for example, a vitamin, and the like. For example, the method may use a non-sucrose fermenting lactic acid bacteria such as *Pediococcus acidilactici* JDM1, a non-sucrose-fermenting derivative of *P. acidilactici* JD1-23. Additionally, this embodiment of the method may combine the food substance and lactic acid bacteria with substances which inhibit fermentation by the lactic acid bacteria, including such substances as sodium chloride, flavorings, antioxidants, antimicrobials, and the like.

A second embodiment of the method of the invention involves combining a modified edible food substance with bacteriocin-producing lactic acid bacteria. The added population of living, bacteriocin-producing lactic acid bacterial cells is unmodified. The edible food substance, however, is substantially free of a substrate that the lactic acid bacteria need for fermentation. The cell concentration is effective to provide bacteriocin to substantially inhibit growth of the food spoilage and/or pathogenic organism.

A third embodiment of the method of the invention involves subjecting the combination of edible food substance and bacteriocin-producing lactic acid bacteria to conditions that inhibit the growth or fermentation activity of the bacteriocin-producing bacteria but permit their production of bacteriocin. Those conditions, which include refrigeration temperatures, such as about 1°–7° C., preferably 3°–5° C., most preferably about 4° C., as well as use of other substances which inhibit cell growth of the lactic acid bacteria, such as flavorings, antioxidants, antimicrobials, sodium chloride, and the like, which either alone or in combination are combined into the food mixture, maintain the population of cells of the lactic acid bacteria at non-growth levels of more than about .10-100%, preferably about 10-50%, in the food mixture.

Storing the food mixture at refrigeration temperatures may contribute to the inhibition of an undesirable pathogen and/or food spoilage organism in the food mixture by slowing down the rate of growth of the organism. For example, *Listeria monocytogenes* was found to grow at a faster rate at 15° C. than 4° C. (See Example 1, infra). Although, according to the present method, foodborne pathogens and/or food spoilage organisms may be inhibited in a food mixture stored at room temperature, particularly with respect to the first and second embodiments of the method, it is preferred that the method of the invention further include maintaining the food mixture at refrigeration temperatures.

Although the food mixture may be stored under either anaerobic or aerobic conditions, anaerobic conditions are preferred. It has been found that greater inhibition of pathogens and/or food spoilage organisms in a food mixture can occur under anaerobic, or vacuum conditions because many pathogens and/or food spoilage organisms are know to grow better under aerobic conditions.

It is preferred that the cells of the lactic acid bacteria are combined with the food substance to provide a food mixture containing about $10^5$-$10^8$ CFU/gram of the food mixture, or about 0.1-1.0 wt-% lactic acid bacteria cells based on the total weight of the food mixture. The cell count of the lactic acid bacteria fraction, at the time it is combined with the food substance, preferably does not increase by more than about 10-100% more preferably 10-50%, as part of the food mixture.

The method is useful in inhibiting the growth of any foodborne pathogen and/or food spoilage organism, including psychrotrophic bacteria, which may be a contaminant in the food substance, including such pathogens as *Listeria monocytogenes, Staphylococcus aureus, clostridium perfringens, Clostirdium, botulinum, Bacillus cereus,* and the like, and food spoilage organisms such as *Streptococcus faecalis, Leuconostoc mesenteroides,* and the like. By inhibiting the growth of food spoilage organisms, the method may be used to extend the shelf-life of a food product.

The invention also provides for a food mixture which contains an edible food substance combined with a population of living cells of a bacteriocin-producing lactic acid bacteria. The food mixture contains a cell concentration of the lactic acid bacteria which is effective to provide bacteriocin at a level which will inhibit growth of a food spoilage or pathogenic organism in the food mixture. The organoleptic characteristics of the edible substance are not significantly altered by the presence of the lactic acid bacteria.

It is preferred that the cell count, or concentration, of the lactic acid bacteria when added to the food substance does not increase by more than about 10-100%, more preferably about 10-50%, within the food mixture. The food mixture preferably contains about $10^5$-$10^8$ CFU/gram cells of the lactic acid bacteria, or about 0.1-1.0 wt-% cells of lactic acid bacteria based on the total weight of the food mixture.

The food mixture is capable of inhibiting the growth of foodborne pathogens such as *Listeria monocytogenes* and *Staphylococcus aureus,* and/or food spoilage organisms such as *Streptococcus faecalis,* which may be a contaminant in the food substance.

In one embodiment, the food mixture includes an edible food substance containing a fermentable substrate for lactic acid bacteria (nutrient, a carbohydrate substance such as sucrose, glucose, lactose, and the like and/or other substance) in combination with living bacteriocin-producing lactic acid bacterial cells which have been modified to render them incapable of significantly fermenting the substrate. The modified lactic acid bacteria are present in the food mixture in a cell concentration effective to provide bacteriocin to substantially inhibit growth of the food spoilage and/or pathogenic organism.

In a second embodiment, the food mixture includes a population of living cells of a bacteriocin-producing lactic acid bacteria and a food substance which is substantially free of a substrate (nutrient, carbohydrate substance and/or other substance) which is required for fermentation by the lactic acid bacteria. The lactic acid bacteria are present in the food mixture in a cell concentration effective to provide bacteriocin to substantially inhibit growth of the food spoilage and/or pathogenic organism.

In a third embodiment, the food mixture includes an edible food substance and a population of living cells of bacteriocin-producing lactic acid bacteria combined under conditions that substantially prevent fermentation by the lactic acid bacteria but maintain viability. As in the other embodiments, the lactic acid bacteria are combined with the food substance at a cell concentration effective to provide sufficient bacteriocin to inhibit growth of a food spoilage or pathogenic organism in the food mixture without significant fermentation of any fermentable substrate present in the food substance. The conditions are those indicated above.

The edible food substance may be a raw food, or a food which is fully processed, cured or fermented, prior to the addition of the lactic acid bacteria, including fish, meats such as ham, beef, sausage, bologna, frankfurters, and the like, vegetables, and milk-based or cream-based foods such as ice cream or cottage cream.

Preferably, the pH of the food mixture is maintained at about pH 5 to less than about 7. The food mixture may be vacuum-packaged or sealed, or maintained under aerobic conditions, or packaged under modified atmosphere conditions.

DETAILED DISCUSSION OF THE INVENTION

This invention is based upon the discovery that some species of lactic acid bacteria will produce bacteriocin in an amount effective to inhibit growth of foodborne pathogens and food spoilage organisms even though the lactic acid bacteria are maintained under conditions that inhibit their cell growth and fermentation of carbohydrates and/or other substances to lactic acid and/or organic acids. The invention provides a method of inhibiting the growth of food spoilage and/or foodborne pathogenic organisms in edible food substances by combining the food substance with living cells of lactic acid bacteria capable of producing substances known as bacteriocins. Inhibitory amounts of bacteriocin are produced in the resulting food mixture under conditions in which the lactic acid bacteria population in the food mixture is not significantly growing and/or fermenting, or producing detectable flavor, aroma, textural or other organoleptic changes in the food substance.

As used herein, the term "fermentation" means lactic acid fermentation, that is, the anaerobic, enzymatic decomposition of carbohydrates to form considerable amounts of lactic acid and/or other organic acids. The term "lactic acid bacteria" includes species from the genera Lactobacillus, Lactococcus, Leuconostoc, Streptococcus, and Pediococcus, and the like. The term "bacteriocin" means a protein substance produced by a bacteria that kills or inhibits closely related strains of bacteria, including, but not limited to, subtilin, nisin, diplococcin, pediocin, and the like. The term "food mixture," as used herein, means the lactic acid bacteria in combination with the edible food substance.

Any organism which is capable of producing bacteriocin in the desired microbial-inhibiting amounts under conditions of non-growth and non-fermentation may be used according to the invention. For example, many pediococci, some species of which are widely used as meat starter cultures, have been shown to produce bacteriocins that are inhibitory to *L. monocytogenes*. See, for example, Bhunia et al., *J. Appl. Bacteriol.* 65:261–268 (1988); Hoover et al, *J. Food Prot.* 51:29–31 (1988); and Pucci et al., *Appl. Environ. Microbiol.* 54:2349–2353 (1988) the disclosures of which are incorporated herein by reference.

To develop a bacteriocin-producing derivative of a lactic acid bacteria, the plasmid DNA coding for bacteriocin production may be conjugally transferred into the target organism. Also, the gene coding for bacteriocin production may be cloned directly into the target organism using the appropriate restriction enzymes and cloning vectors, as described by Maniatis et al. (Molecular Cloning: A Laboratory Manual (1982)).

By "growth- or microbial-inhibiting amounts" it is meant that the numbers or cell count of the food spoilage organisms or pathogens is decreased or does not increase. By "non-growth" of the lactic acid bacteria population, it is meant that the cell count of the lactic acid bacteria increases by no more than about 10–100%, more preferably about 10–50%, after being combined with the food substance to form the food mixture. By "non-fermentation," it is meant that the lactic acid bacteria does not produce more than about 0.1–0.2 g/100 g lactic acid in the food mixture by the break-down of carbohydrates in the food substance.

According to the invention, preferred bacteriocin-producing lactic acid bacteria are Pediococcus species, more preferably *Pediococcus acidilactici*, *P. cerevisiae*, *P. pentosaceous*, or other unspecified Pediococcus. Also useful according to the invention, are derivatives of lactic acid bacteria which have been modified to produce bacteriocin, for example by the transfer of a plasmid which codes for bacteriocin production from one strain to another via conjugation, transduction, and transformation techniques, or electroporation (K. S. Richter, M. S. Thesis, page 105 Univ. Neb.-Lincoln (1989) the disclosure of which is incorporated herein by reference). Examples of lactic acid bacteria derivatives, suitable according to the invention, which have been modified to produce bacteriocin, include but are not limited to *Lactobacillus acidophilus* which has been modified by conjugal transfer of a bacteriocin lactacin F, and lactococci into which bacteriocin genes from Lactococcus have been directly cloned (Muriana and Klaenhammer, *Appln Environ. Microbiol.* 53:553–560 (1987); and Belkum et al., *Appl. Environ. Microbiol.* 55:1187–1191, respectively) the disclosures of which are incorporated herein by reference.

The lactic acid bacteria are added to the edible food substance at a cell concentration sufficient to provide an amount of bacteriocin to inhibit growth of the food spoilage and/or pathogenic bacteria in the food mixture, under conditions in which the cell count of the population of lactic acid bacteria does not significantly increase after it has been combined with the food substance. Preferably, the lactic acid bacteria are added to the food substance in amount to provide about $10^3$–$10^9$ CFU cells bacteria per gram food substance, more preferably about $10^5$–$10^8$ CFU cells bacteria per gram food substance, or in an amount to provide about 0.1–1.0 wt-%, more preferably about 0.1–0.5 wt-%, of the total weight of the combined food mixture. It is preferred that the cell count of the population of lactic acid bacteria in the food mixture does not increase by more than about 10–100%, more preferably about 10–50%, based on the total cell count in the food mixture when the bacteria are initially combined with the food substance.

Cell growth of the lactic acid bacteria in the food mixture may be curtailed by several means. For example, the food mixture may contain a food substance which does not contain significant amounts of a nutrient such arginine, carbohydrate such as sucrose, glucose, lactose, starch and the like and/or other substance such as a required vitamin, which is required for cell growth by the lactic acid bacteria. Also, the lactic acid bacteria may be incapable of fermenting or metabolizing a nutrient such as arginine, a carbohydrate such as sucrose, glucose, starch and the like, or other substance such as a vitamin contained in the food substance and required for cell growth by the lactic acid bacteria used in the food mixture. Cell growth of the lactic acid bacteria may also be inhibited by storing or maintaining the food mixture at refrigeration temperatures of about 1°–7° C., preferably 3°–5° C., most preferably about 4° C. In addition, other substances such as sodium chloride, flavorings, antioxidants, antimicrobials, acids, humectants, stabilizers, emulsifiers, spices, and the like, which inhibit cell growth of the lactic acid bacteria, may also be combined into the food mixture, either alone or in combination.

According to the invention, it is preferred that any increase in cell count of the lactic acid bacteria in the food mixture, or any fermentation of the food substance by the lactic acid bacteria, does not significantly alter the pH or the organoleptic characteristics such as flavor, aroma, color, or texture of the food substance.

To optimize bacteriocin production by the lactic acid bacteria and the growth inhibitory activity of the bacteriocin in the food mixture, it is preferred that the pH of the food mixture is maintained at about pH 4-8, more preferably a pH of about 5-7. The pH may be maintained at the desired level, as for example, by inherent buffers in the food mixture.

When lactic acid bacteria, such as the pediococci and lactobacilli, ferment carbohydrates in a food substance, they produce acid and reduce the pH of the food substance, resulting in changes in the organoleptic characteristics of the food substance. Fermentation of the food substance by the lactic acid bacteria may be controlled by several means. For example, the bacteria can be added to a food substance which does not contain a significant amount of a nutrient such as arginine, a carbohydrate such as sucrose, glucose, lactose, starch and the like, and/or other substance such as a vitamin, which is required for fermentation by the lactic acid bacteria. Also, lactic acid bacteria may be used which are incapable of fermenting a nutrient, carbohydrate and/or other component contained in the food substance and required for fermentation by the lactic acid bacteria. For example, bacteriocin-producing *Pediococcus acidilactici* JD1-23 is incapable of significantly fermenting lactose, raffinose, rhamnose, and esculin (K. S. Richter, M. S: Thesis, at page 188, Univ. Neb.-Lincoln (1989) the disclosure of which is incorporated herein by reference). Additionally, bacteria may be modified through genetic engineering and gene cloning techniques, to obtain derivatives which are bacteriocin-producing, non-carbohydrate fermenting lactic acid bacteria derivatives. Some lactic acid bacterial species may be plasmid DNA cured to be non-carbohydrate fermenting by any known method, as for example, by incubating at elevated incubation temperatures, by addition of novobiocin in a broth medium, by exposure to ultra-violet light, or by spontaneous occurrence. Plasmid DNA-cured derivatives of Pediococcus species which have been modified to be non-carbohydrate producing include, for example, *Pediococcus acidilactici* JDM1 (bacteriocin-producing) or JDM2 (non-bacteriocin-producing), a non-sucrose fermenting derivative of *P. acidilactici* JD1-23 (K. S. Richter, M. S. Thesis, page 102 et seq., Univ. Neb.-Lincoln (1989) the disclosure of which is incorporated herein by reference).

These species of Pediococcus are on deposit at the University of Nebraska Dept. of Food Service and Technology Culture Collection, Lincoln Nebraska. The Collection will make the cultures freely available to the public upon the issuance of this patent application as a patent and will make the cultures available to any official Patent Office Commissioner of any country or his designees during the pendency of this application. The Collection certifies that the cultures are viable and will be kept for a period of at least thirty years. The applicants have also submitted the foregoing modified cultures to the American Type Tissue Collection, Rockville Maryland and have received the following accession numbers for the cultures:

ATCC 55271 (deposited Dec. 17, 1991)
ATCC 55270 (deposited Dec. 17, 1991)

In addition, the food mixture may be stored or maintained at refrigeration temperatures to inhibit fermentation by the lactic acid bacteria. Also, fermentation by the lactic acid bacteria may be inhibited by combining the food substance and lactic acid bacteria with substances such as sodium chloride, flavorings, antioxidants, antimicrobials, homectants, emulsifiers, stabilizers, and the like, to inhibit fermentation by the lactic acid bacteria.

The lactic acid bacteria may be added to any food substance for which inhibition of food spoilage and/or foodborne pathogens is desired, including raw foods and foods which are fully processed, cured or fermented prior to the addition of the inoculant. For example, the lactic acid bacteria may be added to an unprocessed edible food substances including raw vegetables such as lettuce, cabbage or carrots, beef, fish, seafood, and other raw foods; a non-fermented, processed food substance including meat products such as hot dogs or frankfurters, bologna and other luncheon meats; a fermented processed food substance such as sausage or sauerkraut; or a cured processed food substance such as ham. The food substance may also be a milk-based or cream-based foods such as ice cream or cottage cream. The lactic acid bacteria may be added to the food substance by any suitable method, as for example, by blending or mixing, by spraying or misting a suspension of the bacteria and a suitable carrier onto the surface of the food, and the like. For example, the bacteriocin-producing lactic acid bacteria culture could be incorporated into a bologna emulsion containing batter and a meat mixture, prior to further processing, such as stuffing and/or cooking. Raw whole vegetables may be sprayed with or dipped into the lactic acid bacteria culture, and chopped vegetables may be sprayed with, dipped into and/or mixed with the culture. For a milk or cream-based food substance, the bacteriocin-producing lactic acid bacteria could be mixed in with the food substance such as by mixing the bacteria together with the other ingredients.

The method may be used to inhibit the growth of any foodborne pathogen and/or food spoilage organism which may be a contaminant in the food substance, including pathogens such as *Listeria monocytogenes, Staphylococcus aureus,* and the like, or spoilage organisms such as *Streptococcus faecalis, Leuconostoc mesenteroides,* and the like. The method may be used to extend the shelf-life of a food product by inhibiting growth of spoilage organisms.

It is preferred that the food mixture is maintained or stored under anaerobic, or vacuum, conditions in order to further inhibit the growth, and enhance the inhibitory effect of the bacteriocin on the food spoilage organism and/or pathogen. An anaerobic atmosphere for the food mixture may be provided by, for example, vacuum-packaging or -sealing the food mixture according to any suitable known method, or by packaging the food mixture under an anaerobic modified atmosphere, as for example, under a carbon dioxide atmosphere. Where the food mixture is stored under aerobic conditions, the storage temperature conditions may vary from refrigeration temperatures to room, or shelf, temperatures. It is preferred that an aerobically-stored food mixture is maintained at a temperature of about 1°-7° C., preferably 3°-5° C., most preferably about 4° C.

Food mixtures stored at room temperatures, or about 15°-25° C., may be maintained under aerobic or anaerobic conditions. In either case, it is preferred that the food mixture contain (a) a food substance lacking in a nutrient, carbohydrate and/or other substance required for fermentation and/or metabolism by the lactic acid bacteria population of the mixture, and/or (b) a lactic acid bacteria which is non-fermentative with respect to a nutrient, carbohydrate and/or other substance contained in the food substance used in the food mixture and required for fermentation by the lactic acid bacteria.

Food mixtures stored at refrigeration temperatures, or about 1°-7° C., may be maintained under aerobic or anaerobic conditions, and may include a food substance containing a nutrient, carbohydrate and/or other substance which is fermentable by the lactic acid bacteria fraction of the food mixture. The lactic acid bacteria may be either fermentative or non-fermentative with respect to a nutrient, carbohydrate and/or other substance contained in the food substance of the food mixture.

The invention further provides a food mixture which includes a population of living cells of a bacteriocin-producing lactic acid bacteria in combination with an edible food substance. The food substance may be any edible substance, including a raw food substance, or one which is fully processed, cured or fermented prior to the addition of the lactic acid bacteria population.

The food mixture contains the lactic acid bacteria in a cell concentration effective to provide a sufficient amount of bacteriocin to inhibit the growth of food spoilage and/or pathogenic organisms. The bacteriocin is provided without significant increase in cell count and/or without significant fermentation by the lactic acid bacteria population in the food mixture, of a nutrient, carbohydrate and/or other substance contained in the food substance and required for fermentation by the lactic acid bacteria. Any increase in cell count or fermentation by the lactic acid bacteria in the food mixture does not significantly alter the organoleptic properties of the food substance and/or the pH of the food mixture.

Preferably, the food mixture contains about $10^3$–$10^9$ CFU cells bacteria per gram food substance, more preferably about $10^5$–$10^8$ CFU per gram food substance, or about 0.1–1.0 wt-%, more preferably about 0.1–0.5 wt-%, based on the total weight of the food mixture. It is further preferred that the cell count of the lactic acid bacteria in the food substance does not increase by more than about 10–100%, more preferably about 10–50%, based on the cell count when the bacteria were initially combined with the food substance.

To prevent a significant increase in the cell count of the lactic acid bacteria within the food mixture, it is preferred that (a) the food substance does not contain significant amounts of a nutrient, carbohydrate and/or other substance which is required for growth and/or fermentation by the lactic acid bacteria, and/or (b) the lactic acid bacteria are incapable of fermenting and/or metabolizing a nutrient, carbohydrate, and/or other substance contained in the food substance and required for cell growth by the lactic acid bacteria; and/or (c) the food mixture is stored or maintained at refrigeration temperatures of about 1°-7° C., preferably 3°-5° C., most preferably about 4° C.; and/or (d) the food mixture further contains a substance which is capable of inhibiting the cell growth of the lactic acid bacteria, as for example, sodium chloride, flavorings, antioxidants, antimicrobials, and the like, either alone or in combination.

To inhibit fermentation of the food substance by the lactic acid bacteria fraction, it is preferred that (a) the food substance does not contain a significant amount of a nutrient, carbohydrate, and/or other substance which is required for fermentation by the lactic acid bacteria, and/or (b) the lactic acid bacteria is non-fermentative with regard to a nutrient, carbohydrate, and/or other substance contained in the food substance and required by the lactic acid bacteria for fermentation. In addition, the food mixture may be stored or maintained at refrigeration temperatures to inhibit fermentation by the lactic acid bacteria. Also, the food mixture may contain a substance which inhibits fermentation by the lactic acid bacteria, as for example, sodium chloride, flavorings, antioxidants, antimicrobials, humectants, emulsifiers, stabilizers, spices, acids, and the like.

Preferred bacteriocin-producing lactic acid bacteria for the food mixture include, for example, Pediococcus species particularly *P. acidilactici*, *P. pentosaceus*, and the like, or a derivative of a lactic acid bacterial species which has been modified to produce bacteriocin. The lactic acid bacteria may also be modified to be non-carbohydrate fermenting such as non-lactose, non-sucrose, or non-glucose fermenting, and the like, or any combination thereof, as for example, *P. acidilactici* JDM1 (bacteriocin producing) or JDM2 (non-bacteriocin producing) which are non-sucrose fermenting.

The lactic acid bacteria may inhibit the growth of any foodborne pathogen and/or food spoilage organism which may be a contaminant in the food substance, including, but not limited to, such pathogens as *Listeria monocytogenes*, *Staphylococcus aureus*, *Clostridium perfringins*, *Clostridium botulinum*, *Bacillus, cereus*, and the like, and food spoilage organisms such as *Streptococcus faecalis*, *Leuconostoc mesenteroides*, and the like.

An advantage of the present invention is the inhibition of foodborne pathogens and/or food spoilage organisms in raw, or processed or fermented meat and vegetable products through the production of bacteriocins in situ in the food mixture, rather than by the production of acids. Another advantage of the present invention over existing methods of inhibiting foodborne pathogens is the non-destructive means for controlling pathogenic organisms in meat and vegetable products. The invention further provides for optimization of conditions for bacteriocin production and activity under conditions of non-fermentation and non-growth of the lactic acid bacteria fraction of the food mixture. Additionally, the invention incorporates living yet non-growing and non-fermenting lactic acid bacteria into meat and vegetable products which can produce growth inhibiting amounts of bacteriocin without the production of acids, and without changes in pH or organoleptic properties of the food substance.

The invention will be described with reference to various specific and preferred embodiments and techniques. However, it should be understood that many variations and modifications may be made while remaining within the spirit and scope of the invention.

EXAMPLE 1

Control of Post-processing *Listeria monocytogenes* Contamination in Frankfurters The ability of bacteriocin-producing *Pediococcus acidilactici* to control post-processing *Listeria monocytogenes* contamination of frankfurters was examined. Bacteriocin-producing *P. acidilactici* JD1-23 or its plasmid-cured derivative JD-M, and a five-strain composite of *L. monocytogenes* were inoculated onto the surface of fully processed frankfurters. Experiments were done at 4° C. and 15° C. under aerobic and anaerobic conditions. In one study, the effects of high and low Pediococcus cell concentrations on *L. monocytogenes* on vacuum-packaged frankfurters stored at 4° C. were determined. The additional effects of abusive temperature and vacuum-packaging were examined in a second study.

MATERIALS AND METHODS

Culture Preparation

*L. monocytogenes* inocula consisted of five-strain composites of strains Scott A (serotype 4), V7 (serotype 1), F5069 (serotype 4), LM-107M (serotype 1), and LM-108M (serotype 1). LM-107M and LM-108M are meat isolates obtained from M. P. Doyle at the Food Research Institute, Madison, WI. Each of the five strains were inoculated at about 1% from 24-hour cultures into separate 100 ml volumes of tryptose broth (Difco Laboratories, Detroit, MI) and incubated 24 hours at 37° C. Cells were pelleted by centrifugation (5520 X g for 10 minutes at 4° C.), washed in 100 ml sterile physiological saline solution (PPS) (0.85% NaCl, PSS) and resuspended in PSS. The absorbance was measured ($A_{500}$), and each suspension was diluted as necessary to obtain approximately equal cell densities of each isolate. Equal volumes of the five suspensions were mixed, centrifuged, and resuspended to one-fifth of the original volume. The resulting preparation was then diluted in PSS as necessary to obtain the target inoculum level of about $10^4$ *L. monocytogenes*/gram of frankfurter. *Pediococcus acidilactici* JD1-23 and its plasmid-cured, non-bacteriocin producing derivative JD-M were cultivated in lactobacilli MRS broth (Difco Laboratories, Detroit, MI) with added 2% yeast extract (MRS-YE) inoculated 1% from 24-hour cultures.

To prepare low level inocula for Study 1, the pediococci were incubated in 50 ml MRS-YE for 30 hours at 37° C. Cells were sedimented, washed in 50 ml PSS, and resuspended in 50 ml PSS. This suspension was further diluted to obtain the desired inoculum level of about $10^4$ Pediococcus/gram of frankfurter. For preparation of the high level inocula for Study 1, the Pediococcus strains were grown in 100 ml MRS-YE for 30 hours at 37° C., sedimented, washed in 100 ml PSS, and resuspended in 18 ml PSS. Pediococcus inocula for Study 2 was prepared by cultivation in duplicate volumes of 200 ml MRS-YE for 30 hours at 37° C. Cells were harvested by centrifugation, washed once in PSS, and resuspended in 20 ml PSS.

Frankfurter Preparation and Inoculation

Frankfurters were prepared as 45.4 kg batches of a commercial frankfurter formulation by the University of Nebraska-Lincoln Meat Science Laboratory, and contained 16.3 kg of boneless beef trim (20% fat), 22.7 kg of boneless pork trim (20% fat), and 6.35 kg of regular pork (50% fat), 1.1 kg salt, 10.9 kg water, 228 g glucose, 406 g natural spice mixture, 112 g commercial cure mixture (formulated for 156 ppm $NaNO_2$), and 24 g sodium erythorbate. Following grinding of the meat, mixing of the ingredients, and emulsification of the meat mixture, the emulsion was stuffed into 24 mm cellulosic casing using a mechanical stuffer (Model 1000DC, Vemag, Verden, Federal Republic of Germany). Frankfurters were hung on racks and processed in a smokehouse (Alkar, Lodi, WI) according to the following schedule: 130° F. (54.4° C.) dry bulb (DB) for 90 minutes, 150° F. (65.6° C.) DB for 60 minutes, and 170° F. (76.7° C.) DB until finished to an internal temperature of 150° F. (65.6° C.). Following a 5 minute cold water shower, frankfurters were placed in a cooler maintained at 4° C.

Frankfurters were hand peeled, and placed into individual gas-impermeable polyethylene pouches. Pouches were tared and weighed, taped shut, and held at about 4° C. until inoculation. The prepared *L. monocytogenes* and Pediococcus suspensions were mixed 1:1 immediately prior to inoculation of the frankfurters; for frankfurters receiving *L. monocytogenes* only, the cell suspension was mixed 1:1 with PSS. This mixing of the inocula was done to ensure contact between the two species. In order to obtain approximately equal cell numbers on a per gram basis, frankfurters were inoculated 1% v/w (e.g., a 50 g frankfurter received 0.50 ml of inoculum preparation). Frankfurters were inoculated in the pouch by placing about one-half of the inoculum preparation along the length of the frankfurter, turning the pouch over, and placing the remaining preparation along the length of the opposite side. To distribute the inoculum on the surface, the frankfurter was then rolled by hand from outside of the pouch. The spreading of inoculum throughout the pouch was avoided by keeping the frankfurter at a position in the center of the pouch during the rolling process. Pouches were then vacuum-sealed (Multivac, Federal Republic of Germany) and placed in storage at about 4° C. or 15° C. For those treatments to be held at aerobic conditions, pouches were first vacuum-sealed, then cut open along the seal. The ends of these pouches were folded over and taped to minimize drying of the frankfurters during storage.

Sampling and Analysis

For microbiological analysis, three frankfurters from each treatment were chosen randomly at each sampling interval. The entire frankfurter was emptied from the pouch into a sterile stomacher bag (Tekmar Co., Cincinnati, OH); the pouch was rinsed and massaged twice with a known volume of sterile Butterfield phosphate buffer containing 2 mM $MgCl_2$ (BPM). This rinse fluid was then added to the stomacher bag containing the frankfurter. The contents of the stomacher bag were massaged and shaken for 1 minute, then macerated for 2 minutes using a stomacher (model 400, Tekmar). Samples were serially diluted in BPM, and 0.1 ml portions were spread-plated in duplicate onto modified Oxford agar plates (MOX, FSIS modification, D. McClain and W. H. Lee, May 24, 1989, FSIS method for the isolation and identification of *Listeria monocytogenes* from processed meat and poultry products, Laboratory Communication no. 57). Plates were incubated at 35° C. for 24 hours and enumerated. Characteristic colonies from MOX agar plates were confirmed as *L. monocytogenes* by streaking onto tryptose agar and testing for the following: catalase and oxidase production, tumbling motility and umbrella motility at 25° C., Gram reaction, CAMP reaction, and fermentation of mannitol, rhamnose, and xylose. In Study 2, lactic acid bacteria counts of frankfurter homogenates were performed using MRS agar pour plates.

Duplicate frankfurter samples were taken for pH determination. A 10 gram sample of frankfurter was macerated with 90 ml of distilled, deionized water for 2 minutes in a stomacher, and pH was measured with a combination electrode (Corning Glass Works, Medfield, MA). Moisture, protein, fat, and salt determinations were done according to the procedures 950.46, 928.08, 960.39, and 943.01, respectively, of the Association of Official Analytical Chemists (AOAC), Official Methods of Analysis (15th ed), pages 85, 931 and 935, Arlington, VA (1990). Typical frankfurters contained 58.9% moisture, 18.2% protein, 18.1% fat, and 3.2% sodium chloride.

RESULTS

Figure 1A:
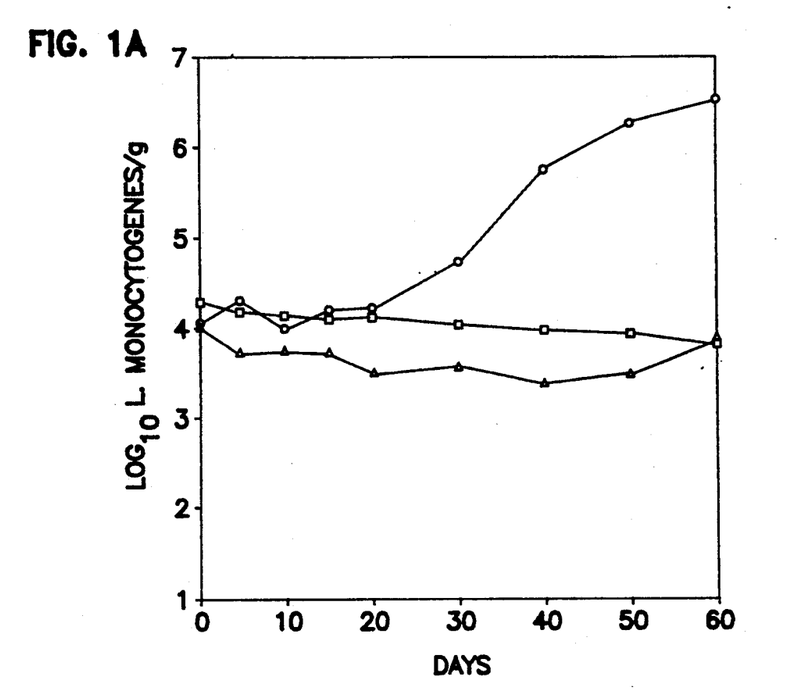
FIG. 1a is a graphical representation of growth and survival of *Listeria monocytogenes* on frankfurters inoculated with high levels of *Pediococcus acidilactici* strain JD1-23 and strain JD-M (Study 1).
Figure 1B:
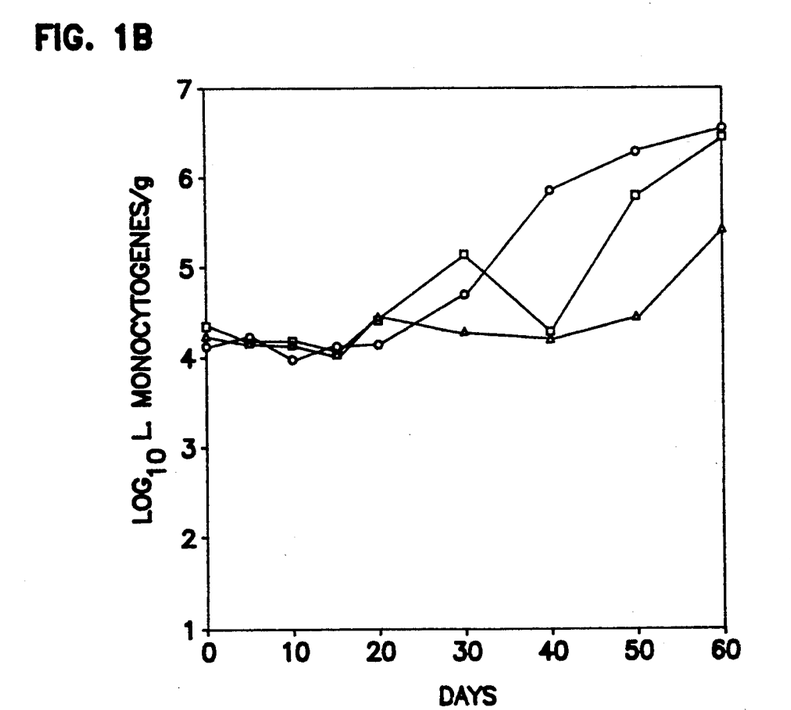
FIG. 1b is a graphical representation of growth and survival of *L. monocytogenes* on frankfurters inoculated with low levels of *P. acidilactici* strain JD1-23 and strain JD-M (Study 1).

Growth and survival of *L. monocytogenes* on frankfurters inoculated with high and low levels of the two Pediococcus strains are shown in FIG. 1. Without added pediococci, *L. monocytogenes* grew from an initial level of $1.2 \times 10^4$ CFU/gram to $4.0 \times 10^6$ CFU/gram at the end of the 60 day storage period, with a lag period of about 20 to 30 days. However, with high levels (HL) of either *P. acidilactici* JD1-23 or JD-M, growth of the Listeria was inhibited, although no reduction in cell numbers were observed (FIG. 1a). In contrast, *L. monocytogenes* grew in those treatments inoculated with low levels (LL) of both *P. acidilactici* JD1-23 and JD-M (FIG. 1b). On LL JD-M frankfurters, the Listeria grew from $2.0 \times 10^4$ CFU/gram to $3.3 \times 10^6$ CFU/g in 60 days, similar to *L. monocytogenes* growth on frankfurters with no added Pediococcus. However, the lag period was longer on low level (LL) JD1-23 frankfurters, being about 40 to 50 days, and the final count at 60 days was lower, at $2.8 \times 10^5$ CFU/gram of frankfurter.

Estimated initial Pediococcus levels of Study 1 frankfurters were $6.0 \times 10^7$ CFU/gram for high level (HL) JD1-23, $2.3 \times 10^7$ CFU/gram for HL JD-M, $1.6 \times 10^4$ CFU/gram for low level (LL) JD1-23, and $5.5 \times 10^3$ CFU/gram for LL JD-M. Lactic acid bacteria counts on MRS agar at 60 days were $4.7 \times 10^7$ CFU/gram for high level (HL) JD1-23, $1.6 \times 10^7$ CFU/gram for HL JD-M, $1.4 \times 10^4$ CFU/gram for low level (LL) JD1-23, and $2.7 \times 10^3$ CFU/gram for LL JD-M. The lack of growth by the pediococci at 4° C. is reflected in the pH results shown below in Table 1. Frankfurters with inoculated Pediococcus did not undergo any substantial drop in pH, with differences of only 0.10 to 0.28 pH units lower than the pH of uninoculated frankfurters and frankfurters inoculated with *L. monocytogenes* alone.

TABLE 1 pH of Frankfurters Inoculated With High and Low Levels of *Pediococcus acidilactici*-Strains JD1-23 and JD-M, and Held at 4° C. Under Anaerobic Conditions (Study 1)

| | High Level | | Low Level | | | |
|---|---|---|---|---|---|---|
| Day | JD1-23 | JD-M | JD1-23 | JD-M | LM[a] | Control[b] |
| 0 | 5.84 | 5.81 | 5.80 | 5.83 | 5.89 | 5.92 |
| 10 | 5.80 | 5.78 | 5.79 | 5.76 | 5.92 | 5.90 |
| 20 | 5.77 | 5.72 | 5.74 | 5.79 | 5.93 | 5.88 |
| 30 | 5.80 | 5.68 | 5.64 | 5.80 | 5.90 | 5.89 |
| 40 | 5.82 | 5.66 | 5.60 | 5.80 | 5.90 | 5.91 |
| 50 | 5.81 | 5.69 | 5.61 | 5.75 | 5.93 | 5.91 |
| 60 | 5.82 | 5.64 | 5.77 | 5.77 | 5.90 | 5.92 |

[a]*L. monocytogenes* alone.
[b]Uninoculated.

Figure 2A:
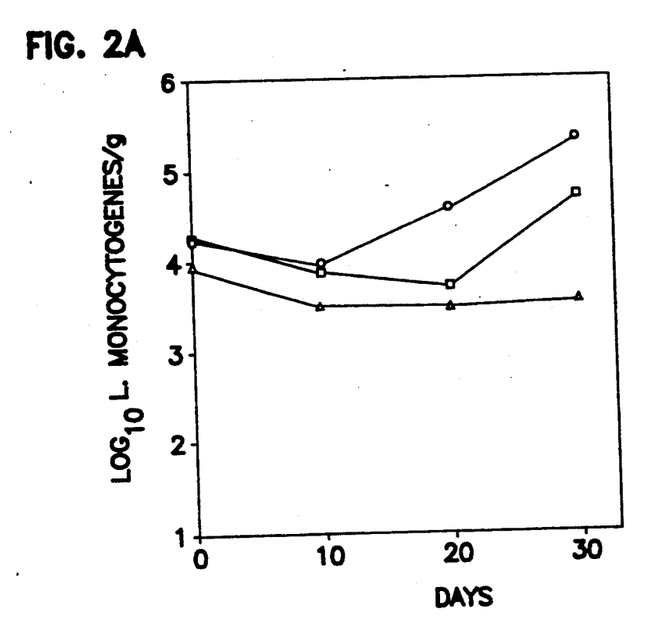
FIG. 2a is a graphical representation of growth and survival of *L. monocytogenes* on frankfurters inoculated with *P. acidilactici* strains JD1-23 and JD-M, and held at 4° C. under aerobic conditions (Study 2).
Figure 2B:
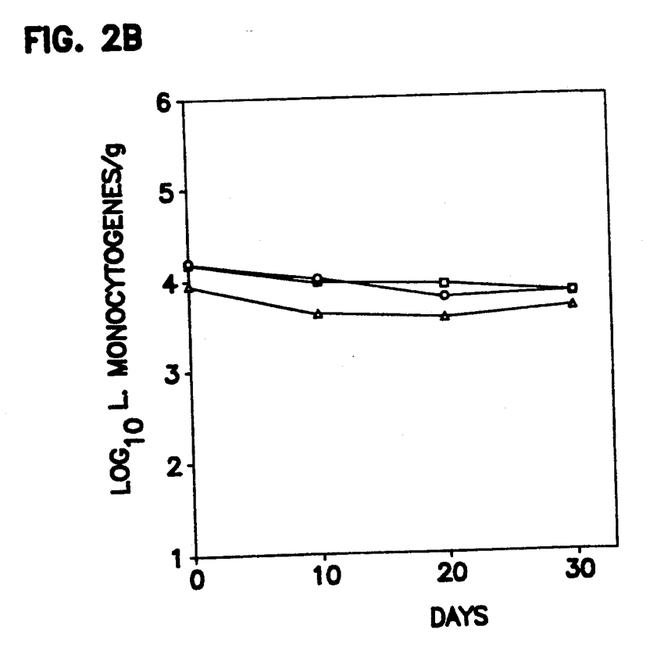
FIG. 2b is a graphical representation of growth and survival of *L. monocytogenes* on frankfurters inoculated with *P. acidilactici* strains JD1-23 and JD-M, and held at 4° C. under anaerobic conditions (Study 2).

Results of *L. monocytogenes* cell counts on frankfurters inoculated with pediococci and stored at 4° C. under aerobic and anaerobic conditions are shown in FIG. 2. Under anaerobic conditions, results were similar to those seen with high level (HL) Pediococcus inocula of Study 1 (FIG. 2b). However, under aerobic conditions, *L. monocytogenes* initiated growth between 10 and 20 days in the absence of Pediococcus, reaching a level of $1.9 \times 10^5$ CFU/gram at 30 days, from an initial level of $1.6 \times 10^4$ CFU/gram (FIG. 2a). The organism also grew on JD-M frankfurters, although a longer lag period and lower final level was observed. In contrast, *L. monocytogenes* numbers on JD1-23 frankfurters had not increased by the end of 30 days. As in Study 1, the pH of the frankfurters at 4° C. did not decrease, and Pediococcus cell counts remained constant throughout the sampling period (Tables 2 and 3, shown below). Aerobic versus anaerobic conditions did not appear to affect the pH or pediococci counts of the frankfurters held at this low temperature.

TABLE 2

Cell Counts of *Pediococcus acidilactici* Strains JD1-23 and JD-M, and pH of Frankfurters Held at 4° C. Under Aerobic Conditions (Study 2)
$\text{Log}_{10}$ *P. acidilactici*/g frankfurter (pH)

| Day | JD1-23 | JD-M | LM[a] | Control[b] |
|---|---|---|---|---|
| 0 | 8.00 (5.82) | 6.98 (5.80) | ND[c] (5.88) | ND (5.78) |
| 10 | 7.96 (5.81) | 6.99 (5.83) | ND (5.82) | ND (5.84) |
| 20 | 8.08 (5.76) | 6.94 (5.82) | ND (5.75) | ND (5.69) |
| 30 | 7.99 (5.78) | 6.81 (5.75) | ND (5.78) | ND (5.84) |

[a]*L. monocytogenes* alone.
[b]Uninoculated control.
[c]Not determined.

TABLE 3

Cell Counts of *Pediococcus acidilactici* Strains JD1-23 and JD-M, and pH of Frankfurters Held at 4° C. Under Anaerobic Conditions (Study 2)
$\text{Log}_{10}$ *P. acidilactici*/g frankfurter (pH)

| Day | JD1-23 | JD-M | LM[a] | Control[b] |
|---|---|---|---|---|
| 0 | 8.00 (5.85) | 6.95 (5.85) | ND[c] (5.81) | ND (5.83) |
| 10 | 8.00 (5.90) | 6.92 (5.79) | ND (5.81) | ND (5.81) |
| 20 | 8.08 (5.83) | 6.96 (5.77) | ND (5.71) | ND (5.72) |
| 30 | 8.04 (5.80) | 6.78 (5.82) | ND (5.77) | ND (5.83) |

[a]*L. monocytogenes* alone.
[b]Uninoculated control.
[c]Not determined.

Figure 3A:
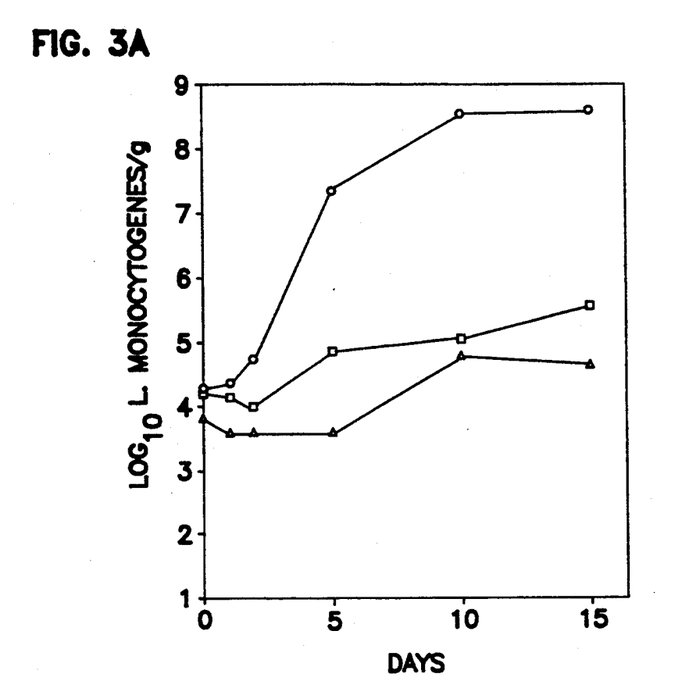
FIG. 3a is a graphical representation of growth and survival of *L. monocytogenes* on frankfurters inoculated with *P. acidilactici* strains JD1-23 and JD-M, and held at 15° C. under aerobic conditions (Study 2).
Figure 3B:
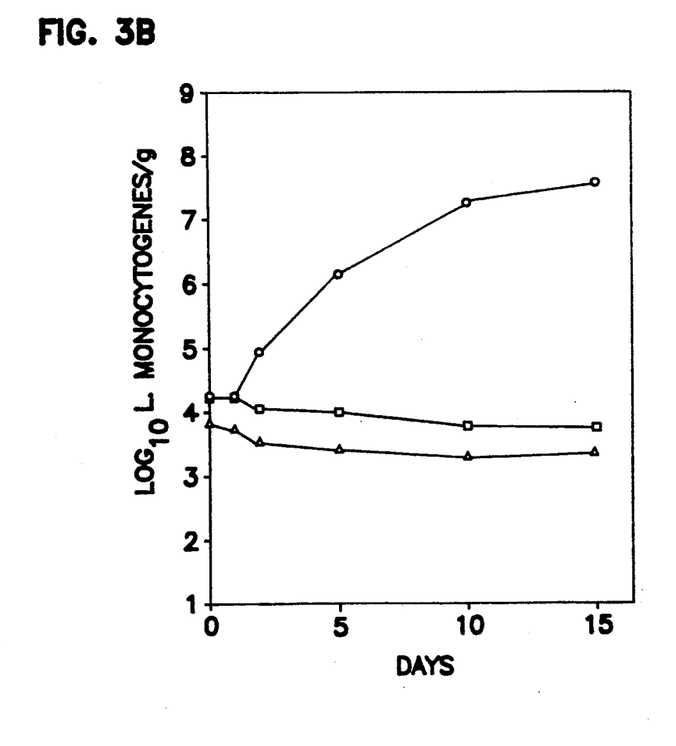
FIG. 3b is a graphical representation of growth and survival of *L. monocytogenes* on frankfurters inoculated with *P. acidilactici* strains JD1-23 and JD-M, and held at 15° C. under anaerobic conditions (Study 2).

Without Pediococcus present, *L. monocytogenes* grew to high levels during 15-day storage at 15° c. under both aerobic and anaerobic conditions, with higher levels of the bacterium observed on frankfurters under aerobic conditions at 5, 10, and 15 days (FIG. 3). Under aerobic conditions, growth of Listeria occurred on both JD1-23 and JD-M frankfurters, although much lower final counts were seen in as compared to Listeria in the absence of pediococci (FIG. 3a). In addition, greater inhibition of *L. monocytogenes* on JD1-23 frankfurters was indicated. Growth of the organism was completely inhibited by both JD1-23 and JD-M on frankfurters held anaerobically at 15° C. (FIG. 3b).

Tables 4 and 5, shown below, summarize results of lactic acid bacteria cell counts and pH determinations of frankfurters held at 15° C. under aerobic and anaerobic conditions, respectively. The cell counts of Pediococcus JD1-23 increased 0.18–0.37 $\log_{10}$ CFU/gram by the end of 15 days; initial JD-M cell counts were lower and increases over the storage period were greater, 1.20–1.41 $\log_{10}$ CFU/gram by the end of 15 days. Aerobic versus anaerobic storage conditions did not appear to greatly affect Pediococcus growth, although somewhat higher final levels of both JD1-23 and JD-M were seen under aerobic conditions. The growth of the pediococci resulted in pH reduction of the frankfurters at this temperature, with pH reductions of 1.05 to 1.23 pH units observed. Final pH of JD1-23 and JD-M frankfurters were comparable, both aerobically and anaerobically. Reduction of pH of frankfurters inoculated with *L. monocytogenes* only was also observed. The final pH of these frankfurters under aerobic conditions was pH 5.36, lower than the final pH of 5.74 of frankfurters held anaerobically, reflecting the higher growth of the bacterium under aerobic conditions.

TABLE 4

Cell Counts of *Pediococcus acidilactici* Strains JD1-23 and JD-M, and pH of Frankfurters Held at 15° C. Under Aerobic Conditions (Study 2)
$Log_{10}$ *P. acidilactici*/g frankfurter (pH)

| Day | JD1-23 | JD-M | LM[a] | Control[b] |
|---|---|---|---|---|
| 0 | 7.99 (5.80) | 6.99 (5.88) | ND[c] (5.89) | ND (5.89) |
| 1 | 8.23 (5.82) | 7.08 (5.90) | ND (5.91) | ND (5.82) |
| 2 | 8.08 (5.85) | 7.30 (5.82) | ND (5.88) | ND (5.92) |
| 5 | 8.53 (5.35) | 8.56 (5.54) | ND (5.83) | ND (5.82) |
| 10 | 8.68 (5.10) | 8.53 (5.07) | ND (5.58) | ND (5.82) |
| 15 | 8.36 (4.75) | 8.40 (4.65) | ND (5.36) | ND (5.89) |

[a]*L. monocytogenes* alone.
[b]Uninoculated control.
[c]Not determined.

TABLE 5

Cell Counts of *Pediococcus acidilactici* Strains JD1-23 and JD-M, and pH of Frankfurters Held at 15° C. Under Anaerobic Conditions (Study 2)
$Log_{10}$ *P. acidilactici*/g frankfurter (pH)

| Day | JD1-23 | JD-M | LM[a] | Control[b] |
|---|---|---|---|---|
| 0 | 8.00 (5.89) | 7.00 (5.78) | ND[c] (5.88) | ND (5.80) |
| 1 | 8.18 (5.81) | 7.04 (5.81) | ND (5.92) | ND (5.85) |
| 2 | 8.11 (5.73) | 7.32 (5.81) | ND (5.97) | ND (5.81) |
| 5 | 8.62 (5.21) | 8.63 (5.27) | ND (5.83) | ND (5.84) |
| 10 | 8.68 (4.76) | 8.62 (4.90) | ND (5.99) | ND (5.83) |
| 15 | 8.18 (4.71) | 8.20 (4.69) | ND (5.74) | ND (5.83) |

[a]*L. monocytogenes* alone.
[b]Uninoculated control.
[c]Not determined.

DISCUSSION

In this example, inhibition of *L. monocytogenes* by either Pediococcus strain was dependent upon cell concentration, as was observed on frankfurters inoculated with high and low levels of *P. acidilactici* JD1-23 and JD-M, and stored anaerobically at about 4° C. A bacteriocin effect was indicated in the low level (LL) inocula experiment. However, the effect was minimal and *L. monocytogenes* on low level (LL) JD1-23 frankfurters grew upon prolonged storage.

The growth of *L. monocytogenes* at 4° C. under aerobic conditions in the absence of added pediococcus demonstrated the importance of vacuum-packaging in controlling this organism. This was also indicated in the 15° C. experiment, where Listeria inoculated on frankfurters without added Pediococcus, grew to higher levels by 30 days aerobically than anaerobically.

The data also indicated that the bacteriocin-producing *P. acidilactici* JD1-23 offered an additional protective effect under aerobic conditions. Acid production by pediococci at 15° C. was not considered to be a factor in the difference of *L. monocytogenes* numbers, as the pH of the frankfurters were comparable between the aerobic and anaerobic treatments. The bacteriocin effect at 15° C. was considered slight, as growth of the Listeria was observed upon further storage. In contrast, no *L. monocytogenes* growth was seen on JD1-23 frankfurters after 30 days at 4° C. under aerobic conditions.

Analysis of *L. monocytogenes* cell count results of Study 2 were complicated by slightly lower Listeria initial counts on treatments inoculated with Pediococcus JD1-23 (FIGS. 2 and 3). The mixing of the Listeria inoculum with $10^9$ CFU/ml of the bacteriocin-producing strain ($10^{10}$ CFU/ml of pediococci were present in the initial Pediococcus preparations prior to mixing 1:1 with Listeria inoculum) was required to yield the desired level of about $10^8$ CFU/gram of pediococci on the frankfurters. This decrease may have occurred due to contact with high levels of the producer strain in the inoculum mixture. This occurred despite limiting the contact time to no more than 10 minutes, after which fresh inocula were mixed if necessary. This mixing effect was observed in Study 1 with high level Pediococcus JD1-23, although to a lesser extent.

In both studies, initial counts on frankfurters of Pediococcus JD-M were somewhat lower than those of JD1-23. This may have played a part in the greater amount of *L. monocytogenes* growth observed on low level (LL) JD-M frankfurters of Study 1. However, this was not considered a factor in the Listeria cell count results of Study 2 in which JD-M levels, despite being lower than those of JD1-23, were still three orders of magnitude greater than the level of *L. monocytogenes*. Moreover, the greater increase in numbers of JD-M at 15° C. versus the increase in numbers of JD1-23, would predict greater competition and thus greater inhibition of *L. monocytogenes* on these frankfurters. However, this was not seen.

In this example, the presence of *P. acidilactici* on *L. monocytogenes*-inoculated frankfurters was observed to give varying degrees of Listeria inhibition, dependent upon Pediococcus concentrations, temperature, and package atmosphere. Although no reduction of *L. monocytogenes* was seen in this example, bacteriocin producer JD1-23 provided an inhibitory effect in cases of aerobic conditions of storage, and for temperature abuse conditions.

EXAMPLE 2

Inhibition of *Listeria monocytogenes* in Sausage By a Non-Growing, Non-Acid Producing Pediococcus Culture The following example illustrates the inhibition of *Listeria monocytogenes* in summer sausage treated with a bacteriocin-producing Pediococcus culture in the absence of fermentation, acid production, and cell growth by the Pediococcus culture.

MATERIALS AND METHODS

Culture Preparation

*Listeria monocytogenes* Scott A (serotype 4b) was grown aerobically in tryptic soy broth fortified with 0.6% yeast extract (TSB-YE) (Difco Laboratories, Detroit, MI) for 24 hours at 37° C. Inoculum was prepared by transferring 1.0 ml of the 24-hour culture into 100 ml TSB-YE, which was incubated aerobically for 24 hours at 37° C. A sufficient volume of this culture was used to yield $10^6$ CFU/gram when added to 13.g kg of meat.

Two cultures of Pediococcus, *P. acidilactici* JD1-23 and Pediococcus MP1-08, were obtained from commercial suppliers as frozen, concentrated cultures. For use in the sausage treatments, the cultures were thawed and added according to manufacturers, directions (approximately $10^7$ cells/gram).

Sausage Manufacture

Five sausage treatments were examined in this study which consisted of two independent replicate trials:

(1) JD: *P. acidilactici* JD1-23 with no added *L. monocytogenes;*
(2) MP: *Pediococcus acidilactici* MP1-08 with no added *L. monocytogenes;*
(3) Scott A: no Pediococcus sp. with added *L. monocytogenes;*
(4) JD/Scott A: *P. acidilactici* JD1-23 with added *L. monocytogenes;* and
(5) MP/Scott A: *P. acidilactici* MP1-08 with added *L. monocytogenes.*

An oil-based commercial seasoning premix processed from spice extracts was used in the sausage treatment.

Boneless beef trimmings (20% fat) and regular pork trimmings (20% fat) were obtained from the University of Nebraska-Lincoln Meat Science Laboratory. All meat was stored at $-20°$ C. before use and was thawed at 4° C. for 3 days before sausage manufacture.

Each treatment consisted of 13.6 kg (30 lb.) of meat. Cold pork trim was ground through a 1.27 cm plate and cold beef trim was ground through a 0.48 cm plate, both on a Hobart grinder (model 4732, Hobart Manufacturing Co., Troy, OH). An 8.2 kg portion of ground beef was added to a mixer (model 100DA, Leland Detroit Manufacturing Co., Detroit, MI) with 150 ml tap water, 450 grams salt, 33.6 grams of a commercial cure mixture containing 2.25 grams $NaNO_2$, 300 grams dextrose, 8.25 grams sodium erythorbate, and 75.2 grams of the indicated spice premix and mixed for 3 minutes. After this initial mixing, a 5.4 kg portion of the ground pork was added and mixed for an additional 2 minutes. At this time, cultures were added and mixed for an additional 3 minutes. For treatments containing *Pediococcus* culture or *L. monocytogenes* only, the culture was suspended in 150 ml tap water immediately before addition to the mixer. For treatments containing both a *Pediococcus* culture and *L. monocytogenes*, the culture was suspended in 75 ml water before addition to the mixer.

Following mixing, the meat was reground through a 0.48 cm grinder plate. The sausage batter was then stuffed into 6.35 cm diameter fibrous casings with a mechanical stuffer (Model 1000DC, Vemag, Verden, Federal Republic of Germany) and clipped on both ends. The sausage chubs were approximately 20 cm long and weighed approximately 450 grams each.

The finished sausages were hung on metal racks and placed in a smokehouse (Alkar, Lodi, WI) maintained at 37.8° C. (100° F) and 50% relative humidity (RH) for 12 hours. The temperature was then raised to 60° C. (140° F) and 55% RH for 1 hour, then to 82.2° C. (180° F.) and 40% RH until sausages were finished to an internal temperature of 64.4° C. (148° F.). The sausages were then showered for 10 minutes with cold water and placed in a cooler maintained at 4° C. Samples to be stored were vacuum-packaged in individual gas-impermeable polyethylene bags using a Kramer-Grebe vacuum packaging machine (model 167/401, Kramer-Grebe, Wallau, Federal Republic of Germany) and held at 4° C. until sampled.

Sausage Sampling

Two sausages from each treatment were chosen randomly at 0, 3, 6, 9, and 12 hours following replacement into the smokehouse and after the complete heat treatment. Duplicate storage samples for analysis were taken at 1 and 2 weeks following manufacture.

Sausages were sampled for *L. monocytogenes* by aseptically opening the casing with a sterile scalpel and removing approximately 25 grams of meat mix, including the surface and the geometric center of the meat mass in the sample. This sample was mixed, and approximately 11 grams was added to 99 ml sterile phosphate-buffered saline (PBS) contained in a sterile stomacher bag (Tekmar Co., Cincinnati, OH). The contents were homogenized for 2 minutes using a stomacher (model 400, Tekmar), serially diluted (1:10) in PBS, and 0.1 ml portions were spread plated in duplicate onto McBride Listeria Agar (MLA) (M. E. McBride and K. F. Girard, *J. Lab. Clin. Med.* 55:153-157 (1960)). Plates were incubated at 37° C. for 24 hours and enumerated.

In addition to direct plating as described above, 25 gram portions of mixed meat samples from sausages exposed to the entire heat process were subjected to enrichment procedures by the method of the Microbiology Division, Food Safety and Inspection Service, U.S. Department of Agriculture, Beltsville, MD.

Two colonies per plate which gave typical appearance for *L. monocytogenes* on MLA or lithium chloride-phenylethanol-moxalactam (LPM) agar (W. H. Lee and D. McClain, *Appl. Environ. Microbiol.* 52:1215-1217 (1986)) with 45° transillumination were confirmed by morphological and biochemical tests, and by serology using Bacto-Listeria O Antisera Type 4 (Difco).

Analytical Methods

The pH of each sausage sample was determined by inserting a combination electrode (Corning Glass Works, Medfield, MA) into the interior of the meat mass and obtaining readings from five different locations within the sausage; the average value was reported. Moisture, fat, Kjeldahl protein, salt, and nitrite determinations were done on duplicate samples of finished sausages from each treatment from each trial (excluding replicate trial 1 of this study) according to the procedure of the Association of Official Analytical Chemists, Official Methods of Analysis (14th ed), pages 431-437, Assoc. Official Anal. Chemists, Arlington, VA (1984).

The finished sausages had an average of 19.3% protein and 20.3% fat. Moisture content ranged from 50.0 to 55.9%, with an average moisture content of 54.6%. Mean sodium chloride content was 3.8%, with a range of 2.9 to 5.5%; mean sodium nitrite content was 5.5 ppm, with a range of 3.7 to 7.4 ppm.

RESULTS AND DISCUSSION

*Pediococcus acidilactici* JD1-23, which provides a bacteriocin which inhibits *Listeria monocytogenes* Scott A, was used as a test organism in the present study; this bacteriocin is inactivated by treatment with several proteolytic enzymes, and is stable to both heating at 91.5° C. for 1 hour and autoclaving at 121° C. for 15 minutes. *P. acidilactici* MP1-08, which did not inhibit *L. monocytogenes* in an initial screening, was chosen as a control.

Data from this study is summarized in Table 1, shown below.

TABLE 1

| | Sausage pH and viable L. monocytogenes count during treatment period without adequate acid production[a] | | | | | | | | | |
|---|---|---|---|---|---|---|---|---|---|---|
| Time | MP | | JD | | Scott A | | MP/Scott A | | JD/Scott A | |
| (h) | CFU/g | pH | CFU/g | pH | Log$_{10}$ CFU/g | pH | Log$_{10}$ CFU/g | pH | Log$_{10}$ CFU/g | pH |
| 0 | <100 | 5.80 (0.01) | <100 | 5.80 (0.01) | 6.29 (0.07) | 5.81 (0.01) | 6.27 (0.09) | 5.77 (0.01) | 6.29 (0.20) | 5.78 (0.01) |
| 3 | <100 | 5.83 (0.01) | <100 | 5.84 (0.01) | 6.22 (0.14) | 5.84 (0.01) | 6.14 (0.06) | 5.82 (0.01) | 6.13 (0.07) | 5.83 (0.01) |
| 6 | <100 | 5.82 (0.01) | <100 | 5.86 (0.01) | 5.97 (0.21) | 5.87 (0.01) | 6.03 (0.04) | 5.79 (0.01) | 5.66 (0.31) | 5.86 (0.01) |
| 9 | <100 | 5.75 (0.01) | <100 | 5.83 (0.02) | 5.87 (0.13) | 5.88 (0.01) | 6.00 (0.04) | 5.75 (0.01) | 4.97 (0.01) | 5.82 (0.02) |
| 12 | <100 | 5.70 (0.03) | <100 | 5.75 (0.01) | 5.95 (0.13) | 5.91 (0.02) | 5.69 (0.16) | 5.62 (0.01) | 4.48 (0.44) | 5.77 (0.02) |

[a]Values reported are means of duplicate determinations from each of two replicate trials. Values within parenthesis represent standard error.

In treatments containing both the Pediococcus culture and L. monocytogenes, the number of L. monocytogenes was reduced after the end of the treatment period; however, high numbers still remained in all sausages examined. The sausage made with JD1-23, however, showed a greater decrease in the numbers of L. monocytogenes present after treatment, as compared to sausage made with MP1-08. This additional decrease, 1.2 log$_{10}$ CFU/gram, was not due to any additional acid produced by JD1-23, since the final pH of the sausage treated with JD1-23 was the same or higher than that treated with MP1-08.

Evidence of the effectiveness of the bacteriocin produced by JD1-23 against L. monocytogenes during sausage treatment was further demonstrated in this study, in which the Pediococcus cultures failed to produce acid, which indicated a lack of fermentation of the added carbohydrate (glucose or dextrose) in the sausages. Due to the lack of adequate acid production and drop in pH during the treatment period, inhibition of the Listeria was not expected. However, subsequent enumeration of L. monocytogenes in sausages sampled during these treatments showed that the Listeria was inhibited by the bacteriocin-producing culture JD1-23 even in the absence of adequate acid production, indicating that bacteriocin production occurred independently of carbohydrate fermentation. At the end of the treatment period, numbers of L. monocytogenes in sausage treated with JD1-23 were decreased an additional 1.2 log$_{10}$ CFU/gram as compared to numbers of L. monocytogenes in sausage treated with MP1-08. The pH of the sausages, including those without added L. monocytogenes did not fall below pH 5.5; however, the pH of JD1-23 sausage was slightly higher than that of MP1-08 sausage, so the additional reduction of L. monocytogenes in JD/Scott A sausage was not due to a pH effect.

Tests were conducted on the sausages in beakers to confirm the substance which inhibited fermentation by the Pediococcus cultures during treatment of the sausages. Tests conducted on the individual ingredients of the sausage, indicated that the spice extract premix inhibited the growth and fermentation of the Pediococcus cultures. The oil-based spice extract, which had been stored for about an extended period of time, was believed to contain by-products of hydrolytic or oxidative rancidity. When the spice extract was replaced with natural spices in a second study, sausage pH of about 5.2 was achieved within 14 hours of fermentation in those preparations containing a Pediococcus starter culture.

What we claim is:

1. A method of inhibiting the growth of a food spoilage or pathogenic organism in a food mixture, comprising: combining an edible food substance, that is fermentable by lactic acid bacteria, and a population of living bacteriocin-producing lactic acid bacterial cells to produce the food mixture, wherein the cells have been modified to render them incapable of significantly fermenting the edible food substance, and the population cell count is effective to provide bacteriocin to inhibit growth of the food spoilage or pathogenic organism in the food mixture.

2. A method according to claim 1, further comprising maintaining the food mixture at a temperature of about 1°-7° C.

3. A method according to claim 1, further comprising maintaining the food mixture under anaerobic conditions.

4. A method according to claim 1, wherein the lactic acid bacteria is incapable of fermenting glucose, lactose, sucrose, raffinose, xylose, or any combination thereof.

5. A method according to claim 1, wherein lactic acid bacteria is a modified Pediococcus species.

6. A method according to claim 1, wherein organoleptic characteristics of the edible substance are not significantly altered by the presence of the lactic acid bacteria.

7. A method according to claim 1, wherein the population of cells of the lactic acid bacteria does not increase by more than about 10-100% in the food mixture.

8. A method of inhibiting the growth of a food spoilage or pathogenic organism in a food mixture, comprising: combining a population of living bacteriocin-producing lactic acid bacterial cells with an edible food substance to produce the food mixture, wherein the edible food substance is substantially free of a substrate needed for fermentation by the lactic acid bacteria, and the cell concentration of the lactic acid bacteria in the food mixture is effective to provide sufficient bacteriocin to substantially inhibit growth of the food spoilage or pathogenic organism.

9. A method according to claim 8, further comprising maintaining the food mixture at a temperature of about 1°-7° C.

10. A method according to claim 8, further comprising maintaining the food mixture under anaerobic conditions.

11. A method according to claim 8, wherein the lactic acid bacteria is selected from the group consisting of Pediococcus acidilactici, P. acidilactici JD1-23, Pediococcus cerevisiae, Pediococcus pentosaceous, or a derivative thereof, and any combination thereof.

12. A method according to claim 8, wherein the population of cells of the lactic acid bacteria does not increase by more than about 10-100% in the food mixture.

13. A method according to claim 8, wherein organoleptic characteristics of the edible substance are not significantly altered by the presence of the lactic acid bacteria.

14. A method of inhibiting the growth of a food spoilage or pathogenic organism in a food mixture, comprising: combining an edible food substance with a population of living bacteriocin-producing lactic acid bacterial cells to produce the food mixture, wherein the lactic acid bacteria are present in a cell concentration effective to provide bacteriocin to substantially inhibit growth of the food spoilage or pathogenic organism, and are under conditions that prevent significant fermentation of the edible food substance by the bacteria.

15. A method according to claim 14 wherein the conditions include maintaining the food mixture at a temperature of about 1°-7° C., and the population of cells of the lactic acid bacteria does not increase by more than about 10-100% in the food mixture.

16. A method according to claim 14, further comprising maintaining the food mixture under anaerobic conditions, or modified anaerobic conditions.

17. A method according to claim 14, wherein the lactic acid bacteria is selected from the group consisting of *P. acidilactici* JD1M, *Pediococcus acidilactici*, *P. acidilactici* JD1-23, *Pediococcus cerevisiae* or a derivative thereof.

18. A method according to claim 14, wherein organoleptic characteristics of the edible substance are not significantly altered by the presence of the lactic acid bacteria.

19. A method according to claim 14, further comprising maintaining the food mixture at a pH of about 5 to less than about 7.

20. A food mixture, comprising:
an edible food substance, that is fermentable by lactic acid bacteria, in combination with a population of living bacteriocin-producing lactic acid bacterial cells which have been modified to render them incapable of significantly fermenting the edible food substance, the cell concentration being effective to provide sufficient bacteriocin to inhibit growth of a food spoilage or pathogenic organism in the food mixture.

21. A food mixture according to claim 20, wherein the concentration of the lactic acid bacteria added to the food substance does not increase by more than about 10-100% within the food mixture.

22. A food mixture according to claim 20, wherein the lactic acid bacteria is selected from the group consisting of *Pediococcus acidilactici*, *P. acidilactici* JD1-23, *P. acidilactici* JDM1, *Pediococcus cerevisiae*, *Pediococcus pentosaceous*, or a derivative thereof, or any combination thereof.

23. A food mixture according to claim 20, wherein the lactic acid bacteria is incapable of fermenting glucose, lactose, sucrose, raffinose, xylose, or any combination thereof.

24. A food mixture according to claim 20, wherein organoleptic characteristics of the edible substance are not significantly altered by the presence of the lactic acid bacteria.

25. A food mixture, comprising:
an edible food substance in combination with living bacteriocin-producing lactic acid bacterial cells, the food substance being substantially free of a substrate needed for fermentation by the lactic acid bacteria, and the cell concentration being effective to provide sufficient bacteriocin to inhibit growth of a food spoilage or pathogenic organism in the food mixture.

26. A food mixture, comprising:
an edible food substance in combination with a population of living bacteriocin-producing lactic acid bacterial cells, the cell concentration being effective to provide sufficient bacteriocin to inhibit growth of a food spoilage or pathogenic organism in the food mixture and the combination being made under conditions that prevent significant fermentation of the edible food substance by the bacteria.

27. A food mixture according to claim 26 wherein the conditions include maintaining the food mixture at a temperature of about 1°-7° C.

* * * * *

UNITED STATES PATENT AND TRADEMARK OFFICE
CERTIFICATE OF CORRECTION

PATENT NO. :    5,186,962
DATED      :    February 16, 1993
INVENTOR(S):    Robert W. Hutkins et al.

It is certified that error appears in the above-identified patent and that said Letters Patent is hereby corrected as shown below:

At column 9, line 67, insert --JDM1-- before "ATCC 55271".

At column 9, line 68, insert --JD1-23-- before "ATCC 55270".

Signed and Sealed this

Twenty-eighth Day of December, 1993

Attest:

BRUCE LEHMAN

Attesting Officer     Commissioner of Patents and Trademarks